United States Patent
Tomiyoshi et al.

(10) Patent No.: US 7,795,043 B2
(45) Date of Patent: Sep. 14, 2010

(54) METHOD OF MANUFACTURING OSCILLATOR DEVICE

(75) Inventors: Toshio Tomiyoshi, Yokohama (JP); Takahisa Kato, Tokyo (JP); Atsushi Kandori, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 12/201,315

(22) Filed: Aug. 29, 2008

(65) Prior Publication Data

US 2009/0061537 A1    Mar. 5, 2009

(30) Foreign Application Priority Data

Aug. 30, 2007    (JP) ............... 2007-223322

(51) Int. Cl.
*H04L 21/00* (2006.01)

(52) U.S. Cl. ............... 438/3; 359/298; 359/280; 310/36

(58) Field of Classification Search ............ None
See application file for complete search history.

(56) References Cited

U.S. PATENT DOCUMENTS

| | | | |
|---|---|---|---|
| 7,038,834 B2 * | 5/2006 | Kato et al. | 359/298 |
| 7,061,063 B2 | 6/2006 | Kato et al. | 257/417 |
| 7,148,591 B2 * | 12/2006 | Mizoguchi et al. | 310/36 |
| 2004/0070816 A1 * | 4/2004 | Kato et al. | 359/291 |
| 2004/0075522 A1 * | 4/2004 | Kato et al. | 336/200 |
| 2007/0144867 A1 * | 6/2007 | Torashima et al. | 198/346.1 |
| 2007/0279725 A1 * | 12/2007 | Kato et al. | 359/224 |
| 2007/0291343 A1 * | 12/2007 | Kato et al. | 359/198 |
| 2008/0180771 A1 * | 7/2008 | Watanabe et al. | 359/199 |

FOREIGN PATENT DOCUMENTS

| | | | |
|---|---|---|---|
| JP | 2002-311372 | | 10/2002 |
| JP | 2002311372 A | * | 10/2002 |
| JP | 2005-181576 | | 7/2005 |
| JP | 2007-14130 | | 1/2007 |

* cited by examiner

*Primary Examiner*—Ha Tran T Nguyen
*Assistant Examiner*—Shantanu C Pathak
(74) *Attorney, Agent, or Firm*—Fitzpatrick, Cella, Harper & Scinto

(57) ABSTRACT

A method of manufacturing oscillator devices each having an oscillator and a resilient supporting member for supporting the oscillator for oscillatory motion, includes a step of processing one and the same substrate to form oscillators and resilient supporting members of oscillator devices so that oscillators of adjacent oscillator devices are connected to each other, a step of forming or placing a magnetic material so that it extends across the connected oscillators of the adjacent oscillator devices, and a step of simultaneously cutting and separating the connected oscillators and the magnetic material formed or placed to extend across the connected oscillators, whereby oscillator devices, such as oscillatory type actuators having good reliability and performance evenness can be manufactured with high productivity.

5 Claims, 5 Drawing Sheets

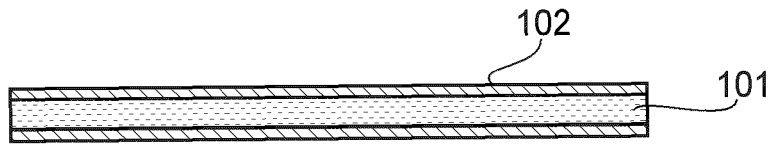
FIG.1A
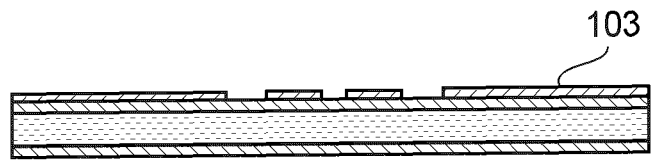
FIG.1B
FIG.1C
FIG.1D
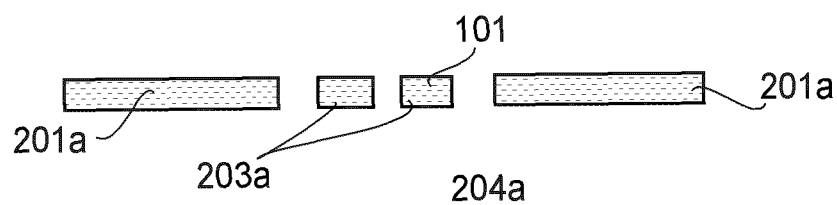
FIG.1E
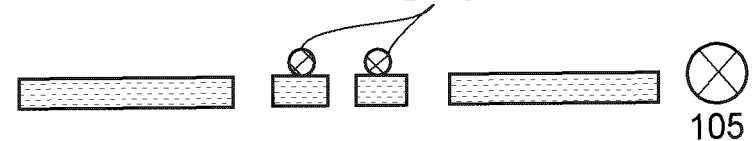
FIG.1F
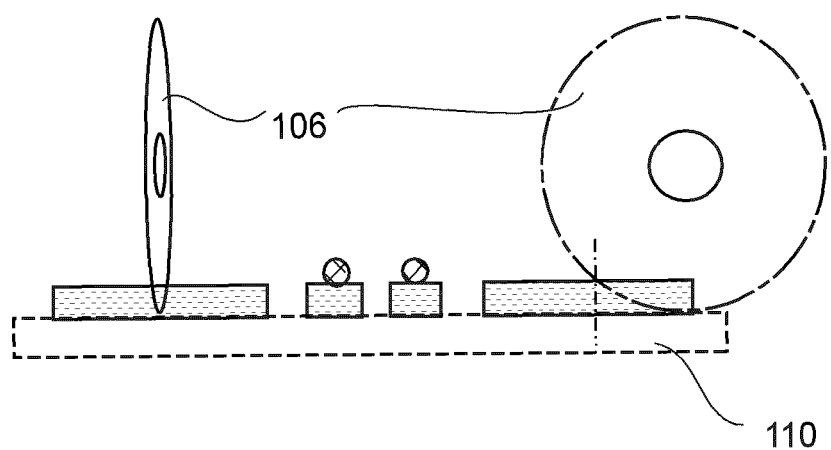
FIG.1G

METHOD OF MANUFACTURING OSCILLATOR DEVICE

FIELD OF THE INVENTION AND RELATED ART

This invention relates to a method of manufacturing plural oscillator devices such as oscillatory type actuators to be produced using a semiconductor substrate. More specifically, the invention concerns a method of manufacturing oscillator devices such as oscillatory type actuators which comprise an oscillating member (oscillator) having a permanent magnet.

In recent years, as a technique for producing a large number of devices having a microstructure upon a semiconductor substrate, such as silicon or the like, a micromachining technique has been developed. The monocrystal silicon has superior physical properties and mechanical characteristics, and the surface flatness and the processing characteristics thereof as a substrate are very good. Therefore, it is used widely for production of microstructures. Hence, while combining the characteristics of the monocrystal silicon with the micromachining technique together, various devices have been devised and, specifically, those devices working as an actuator for converting an input energy into a kinetic energy have been developed largely. As one example of these, oscillatory type actuators based on an electromagnetic force or a permanent magnet have been proposed, and these have been developed as a device having a superior dynamic characteristic and energy efficiency.

Under the technical situations described above, an oscillatory type actuator which can be produced by using a permanent magnet or the like such as illustrated in FIG. 5 has been proposed (see Japanese Laid-Open Patent Application No. 2002-311372). In this suggested example, a plate 1100 made of monocrystal silicon substrate material of a thickness 0.2 mm has formed at its central portion long arcuate-shaped windows 1200 extending through the substrate from its top to its bottom. Furthermore, a resonator or oscillator 1300, which provides an oscillating member, is formed thereon. Then, the oscillator 1300 is connected an outer frame of the window 1200 through a beam 1400 of a resilient supporting member. At the subsequent step, a rectangular recess 2100 for setting a magnet is formed on one side of the oscillator 1300. The substrate is thereafter cut and separated. Subsequently, a permanent magnet 1500, such as Permalloy (registered trademark), is embedded in the recess 2100, and it is fixed there.

As described above, based on the micromachining technique, a structure which provides an oscillator as well as a beam which provides a resilient supporting member is formed on the monocrystal silicon substrate, while a recess for positioning a magnet is formed on one side of the oscillator by etching or the like. Then, through the etching process, a process of cutting and separating the device and a process of setting a permanent magnet, a desired oscillatory type actuator can be produced.

However, in the method of producing oscillatory type actuators in which the oscillator moves at a high speed about the beam which provides a resilient supporting member, there are inconveniences as follows.

In order that the oscillator, which provides an oscillating member, operates stably or, alternatively, produces high-speed motion and a resonance operation about the resilient supporting member, the center of gravity position of the oscillator with respect to the axis center of the resilient supporting member is very important. More specifically, with respect to the beam, the overall center of gravity position determined by the position of the oscillator and the shape or setting position of the permanent magnet must be considered carefully. In other words, it is necessary to place the overall center of gravity position at an appropriate position, typically on the axis center of the resilient supporting member.

The production method disclosed in Japanese Laid-Open Patent Application No. 2002-311372 comprises a step of forming a resonator or oscillator, a step of forming a recess for determining the position of the permanent magnet, and a step of setting the permanent magnet. These steps have their own dimensional tolerances, respectively. Thus, the center of gravity position of the whole oscillator at the time of the final device production has a value corresponding to the sum of these dimensional tolerances. Particularly, as regards the permanent magnet having a large density as compared with monocrystal silicon, the figure tolerance and setting-position misregistration thereof will have a large influence upon the center of gravity position of the whole oscillator. Therefore, the shape and setting precision of the permanent magnet must be considered most carefully.

In the suggested example of Japanese Laid-Open Patent Application No. 2002-311372, the formation of a recess for avoiding the magnet-position misregistration leads to an increase of the number of steps, depending on the recess forming process. Furthermore, even if such recess for magnet setting is formed, use of a high-technique magnet shaping process or a high-precision alignment setting device is necessary.

Furthermore, in the process of setting a magnet on the substrate, the presence/absence of the magnetic force of the permanent magnet is critical. When a magnet having a magnetic force is going to be set, the interaction of magnetic forces between magnets must be considered, and close attention has to be paid to r the handling. Namely, magnets are easy to attract each other, and it is not easy to set magnets while registering their magnetization directions appropriately. On the other hand, if in the suggested example of Japanese Laid-Open Patent Application No. 2002-311372 a permanent magnet (magnetic material) having no force is set at the magnet setting step without changing the disclosed procedure, a magnetic setting step and a polarizing step have to be done with respect to each of the device after the cutting and separation. Thus, the process is very complicated.

SUMMARY OF THE INVENTION

The present invention provides a method of manufacturing an oscillator device by which at least one of the inconveniences described above can be avoided or reduced.

In accordance with an aspect of the present invention, there is provided a method of manufacturing oscillator devices each having an oscillator and a resilient supporting member for supporting the oscillator for oscillatory motion, the method comprising: a step of processing one and the same substrate to form oscillators and resilient supporting members of oscillator devices so that oscillators of adjacent oscillator devices are connected to each other; a step of forming or placing a magnetic material so that it extends across the connected oscillators of the adjacent oscillator devices; and a step of simultaneously cutting and separating the connected oscillators and the magnetic material formed or placed to extend across the connected oscillators.

In one preferred form of this aspect of the present invention, the magnetic material formed or placed to extend across the connected oscillators is unmagnetized, and, before the cutting and separating step, there is a step of applying a magnetic field to a portion or the whole of the substrate to magnetize the magnetic material at once to produce a permanent magnet.

The magnetic material formed or placed to extend across the connected oscillators may be a permanent magnet having previously been magnetized.

The connected oscillators and the magnetic material formed or placed to extend across the connected oscillators may be simultaneously cut and separated by performing a dicing operation.

The connected oscillators and the magnetic material formed or placed to extend across the connected oscillators may be simultaneously cut and separated by using a laser.

In the method of manufacturing an oscillator device such as an oscillatory type actuator having an oscillator and a resilient supporting member, according to an aspect of the present invention, it is not necessary to form a rectangular recess for the magnet setting in each of a plurality of oscillators. Furthermore, it does not need a high-precision setting device. Moreover, the number of processing steps can be reduced since the magnet or magnetic material is shared by a plurality of oscillators. Thus, a manufacturing method having a good productivity can be provided.

Furthermore, since a magnet or magnetic material is positioned with respect to a plurality of oscillators at once and the oscillators having such magnet can be cut and separated at the same time, the production of oscillators with a magnet or magnetic material as well as the production of oscillator devices can be done very easily and accurately. Thus, the productivity can be improved and, additionally, oscillators having the least center of gravity deviation with respect to the resilient supporting member can be produced.

Hence, oscillator devices such as oscillatory type actuators which comprise an oscillator resonating at a high speed and a resilient supporting member, which have a well balanced oscillator center of gravity r, and which provide a high reliability and good performance evenness, can be produced at a good productivity.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A-1G are diagrams showing the processes concerning a method of manufacturing an oscillator device such as an oscillatory type actuator, according to a first embodiment of the present invention.

DESCRIPTION OF THE PREFERRED EMBODIMENTS

Preferred embodiments of the present invention will now be described with reference to the attached drawings.

Embodiment 1

The present invention relates to a method of manufacturing an oscillator device having an oscillator and a resilient supporting member for supporting the oscillator for oscillatory motion.

Figure 2A:
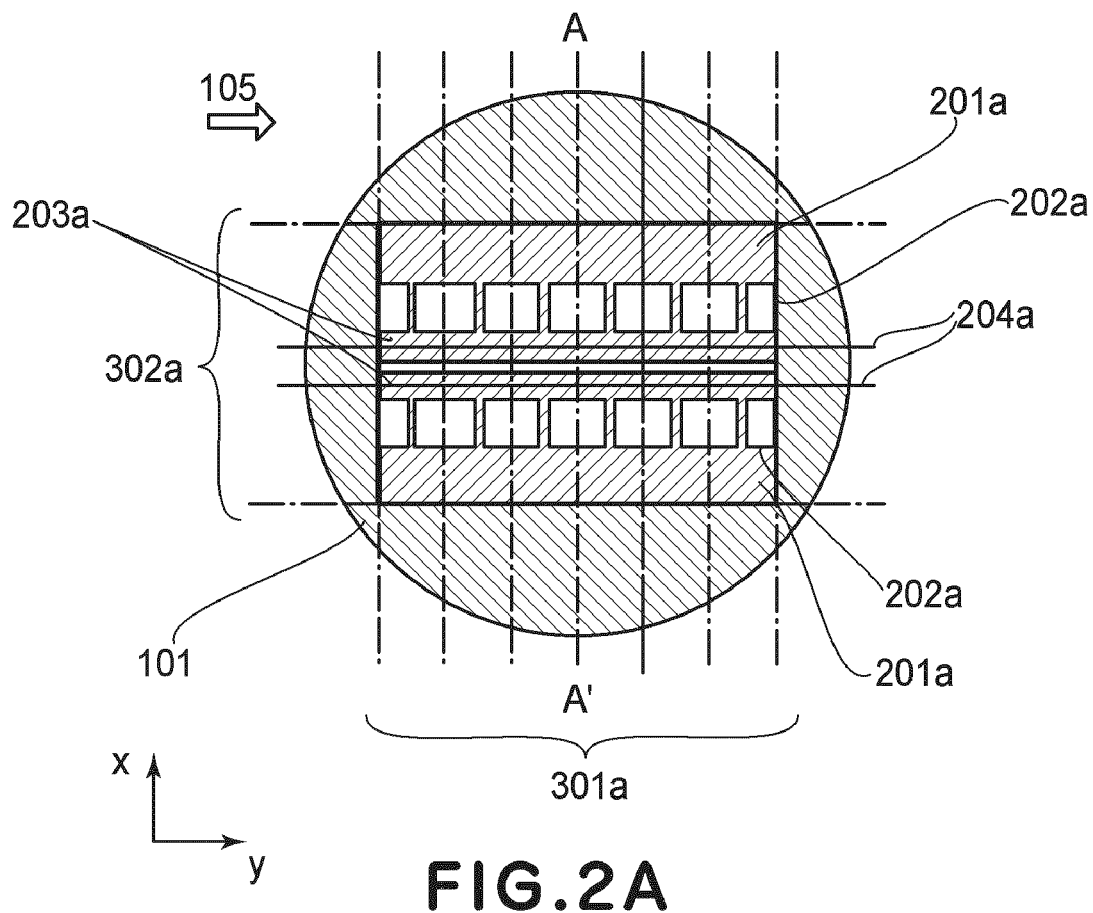
FIGS. 2A and 2B are schematic diagrams for explaining an oscillator device such as an oscillatory type actuator based on the manufacturing method of the first embodiment, the diagrams showing the same in a non-separated state and an assembled state, respectively.
Figure 2B:
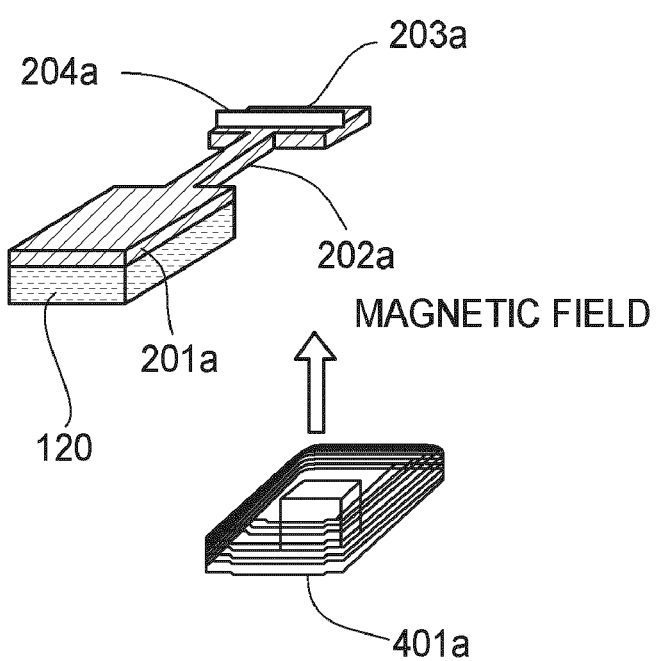

Referring to FIGS. 1A-1G and 2A and 2B, a method of manufacturing an oscillatory type actuator according to a first embodiment of the present invention will be explained. FIGS. 1A-1G illustrate the manufacturing processes, along a section A-A' in FIG. 2A, which illustrates an oscillatory type actuator before cutting and separation. FIG. 2B illustrates the oscillatory type actuator after being manufactured/assembled.

First of all, as shown in FIG. 1A, etching protection films 102, such as a silicon nitride film or thermal oxide film, are formed on the top and bottom surfaces of a monocrystal silicon substrate 101, which is one and the same substrate member. With regard to this etching protection film 102, a material having resistance to various etching processes to be carried out in the succeeding steps is chosen, and it may comprise a single layer film or a combination of two or more layers of films. The method of forming the etching protection film 102 may use a deposition method, sputtering method or vapor-phase film forming method, for example.

Subsequently, as shown in FIG. 1B, a resist pattern 103 is formed on the etching protection film 102 by a photolithography technique, for the purpose of making an oscillator (203a in FIG. 2A) and a resilient supporting member (202a in FIG. 2A) of an oscillatory type actuator. The resist pattern 103 is formed with such shape a plurality of mutually connected oscillators 203a and resilient supporting members 202a therefor as well as substrate-connection members 201a are connected to each other such as shown in FIG. 2A. Namely, by processing one and the same substrate, the oscillators and resilient supporting members of plural oscillator devices are so formed that the oscillators of adjacent oscillator devices are connected to each other. Here, a pattern such as a V-shaped groove may be formed in a portion of the oscillator, for setting a magnet or magnetic material. Subsequently, as shown in FIG. 1C, the shape based on the resist pattern 103 is transferred to the etching protection film 102 based on a wet or dry etching technique.

After this, as shown in FIG. 1D, by using the etching protection film 102 having transferred thereon the patterns of the substrate-connection members 201a, resilient supporting members 202a and oscillators 203a as a mask, the monocrystal silicon substrate 101 is processed by penetration-etching, whereby a structure having windows at the substrate 101 side is produced. With regard to this penetration-etching process, a micromachining technique may be used. For example, a crystal anisotropy etching process based on an alkaline solution or a deep-engraving anisotropic etching process using plasma may be used. The procedures shown in FIGS. 1B, 1C and 1D may be carried out to the opposite-side surface of the substrate 101 in a similar manner, to form the resilient supporting member 202a and the oscillator 203a.

Subsequently, as shown in FIG. 1E, the etching protection film 102 is removed by a wet or dry etching technique. Then, as shown in FIG. 1F, a magnetic material is formed or placed so that it extends across plural oscillators of adjacent oscillator devices which are connected to each other. Namely, magnets or magnetic materials 204a are set on the silicon substrate 101 having windows formed therein, in a direction perpendicular to the sheet of the drawing. More specifically, as shown in FIG. 2A, the magnets or magnetic materials 204a are installed so that each extends across the mutually connected oscillators 203a. These magnets or magnetic materials 204a may be disposed while using a pattern such as a V-shaped groove mentioned hereinabove. The magnets or magnetic materials 204a may be fixed by using an adhesive.

As shown in FIG. 2A, the magnets or magnetic materials 204a are disposed parallel to the mutually connected oscillators 203a so that each can be shared by plural oscillators 203a. Each magnet or magnetic material 204a may comprise an elongated such as a rod-like member, for example, corresponding to the wafer size. Preferably, the magnet or magnetic material 204a may comprise a magnetic material prior to being polarized, and FeCoCr, which is a soft magnetic material, may be used as an example. Each oscillator 203a may have a single magnet or magnetic material 204a as illustrated, or it may have two or more magnetic materials. Furthermore, magnets or magnetic materials may be provided on both of the top and bottom surfaces of the substrate 101.

If an unmagnetized magnetic material 204a prior to being magnetized is provided, a magnetic field 105 in the direction perpendicular to the sheet of the drawing may be applied to the silicon substrate 101 afterwards, as shown in FIG. 1F. FIG. 2A illustrates the state in which a magnetic field is applied to a portion of or the whole of the magnetic material 204a parallel to the same (i.e., the magnetic field 105 in the direction of an arrow), whereby the magnetic material 204a is polarized at once to provide a permanent magnet.

In the above-described magnetization process of the magnet, since a magnetic field is applied to a portion of or the whole of the substrate before cutting and separating the oscillators and magnets, the handling of the unmagnetized magnetic material during the manufacturing process is facilitated and characteristic dispersion of individual magnets is reduced. Furthermore, a manufacturing method for oscillator devices such as oscillatory type actuators, being superior in mass productivity, is accomplished.

Permanent magnets 204a having already been magnetized may be set so that each extends across a plurality of mutually connected oscillators 203, as shown in FIG. 2A. In that case, although the handling is not so easy as compared with unmagnetized magnetic materials, it is still easier than in a case where a lot of discrete permanent magnets have to be handled. In that case, it is no more necessary to apply a magnetic field 105 in the direction perpendicular to the sheet of the drawing, as shown in FIG. 1F. As a further alternative, soft magnetic materials may be just used as they are, without a magnetization process.

Furthermore, an elongated rod-like magnetic material may not be used and, instead, the magnetic material 204a may be formed as a stripe-like magnetic film extending across plural oscillators 203a, by using a sputtering process or an electroplating process.

Subsequently, as shown in FIG. 1G, a dicing (blade) 106 is used to simultaneously cut and separate the connected oscillators and the magnetic materials extending across these oscillators. The cutting/separating process may use scribing, laser or etching, for example. As shown by x-direction cutting/separating lines 301a and y-direction cutting/separating lines 302a in FIG. 2A, the magnets 204a, oscillators 203a and substrate-connection members 201a are cut and separated simultaneously. Thus, the magnets 204a and oscillators 203a are formed to have approximately the same widths, such that the center of gravity of the whole oscillator can be set precisely. FIG. 1G illustrates the state in which the cutting/separation along the y-direction lines 302a is carried out by use of a dicing (blade) 106 shown by a solid line 106, while the cutting/separation along the x-direction lines 301a is carried out by use of a dicing (blade) 106 shown by a broken line 106. Furthermore, as shown in FIG. 1G, the cutting/separating operation is carried out while the wafer is kept adhered to an adhesive sheet 110 and, after the cutting/separation, individual structures are removed from the adhesive sheet 110.

In the structure comprising an oscillator 203a with a magnet 204a, a resilient supporting member 202a and a substrate-connection member 201a after being separated, the substrate-connection member 201a is fixed to the substrate 120 and it has a disposition shown in FIG. 2B. In this disposition structure, a magnetic force of sinusoidal-wave drive is applied to the cut/separated magnet 204a and oscillator 203a by use of an electromagnet 401a or the like, and the oscillator 203a oscillates around an axis, which is defined by the resilient supporting member 202a. If the component shown at 204a is a soft magnetic material, the oscillator 203a with a magnetic material 204a receives only an attraction force from the electromagnet 401a. Therefore, in this case, the electric current to the electromagnet 401a is switched on/off so as to produce oscillation of the oscillator 203a around the axis defined by the resilient supporting member 202a. In this manner, the oscillatory type actuator, which can be produced with high productivity in accordance with the above-described manufacturing method and which has an accurate center of gravity balance, can function very well.

Embodiment 2

Figure 3A:
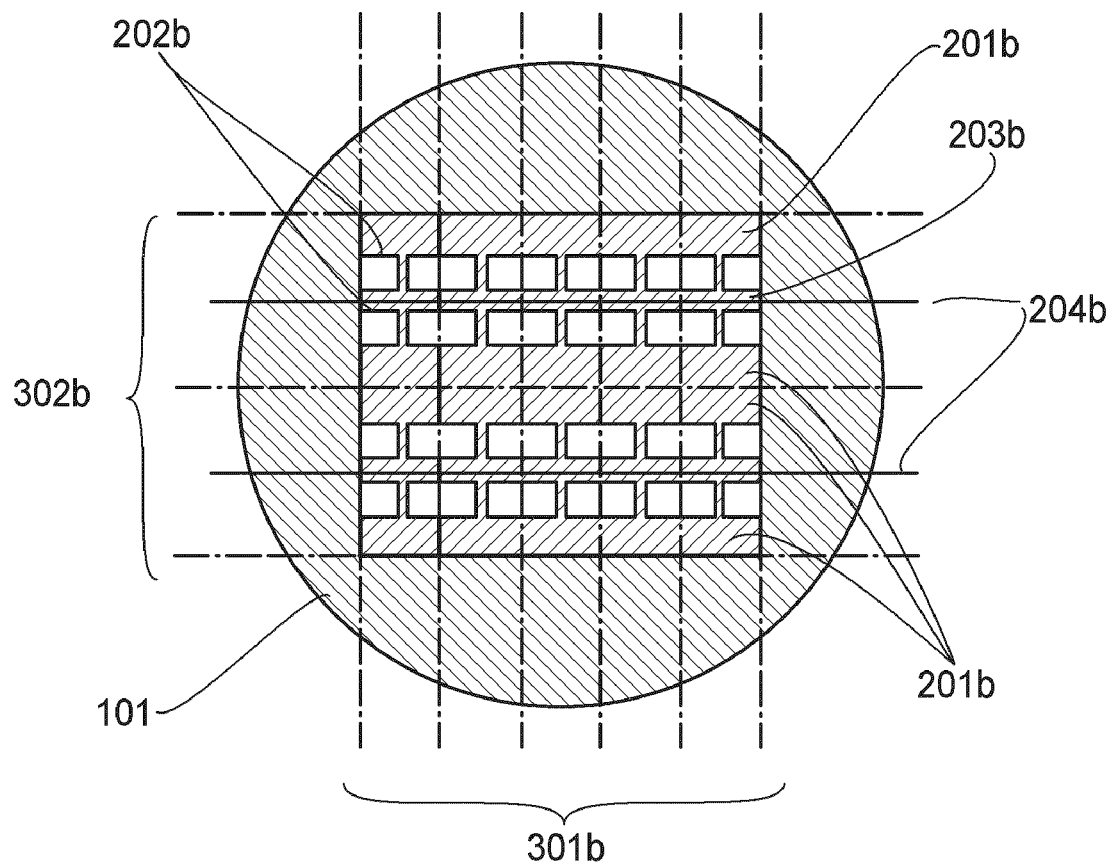
FIGS. 3A and 3B are schematic diagrams for explaining an oscillator device such as an oscillatory type actuator according to a manufacturing method of a second embodiment of the present invention, the diagrams showing the same in an unseparated state and an assembled state, respectively.
Figure 3B:
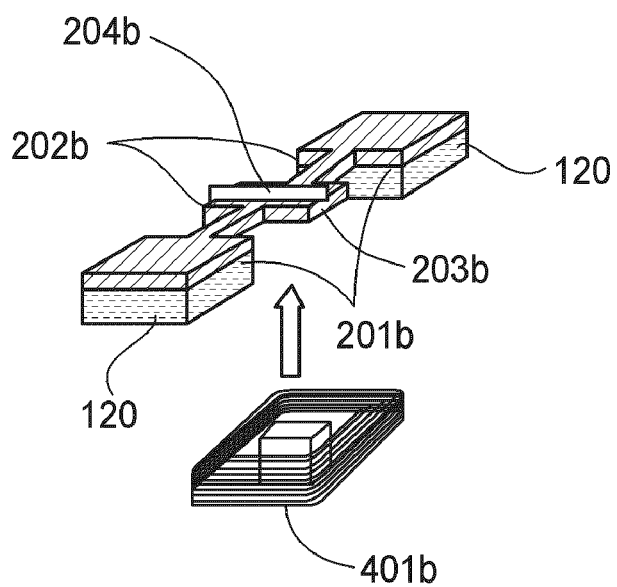

FIGS. 3A and 3B are schematic diagrams for explaining a method of manufacturing oscillatory type actuators according to a second embodiment of the present invention. The manufacturing method of the second embodiment includes similar steps as those of FIGS. 1A-1G.

In this embodiment, the basic structure of an oscillatory type actuator which includes an oscillator 203b, resilient supporting members 202b and substrate-connection members 201b, comprises a structure being supported at is opposite ends. More specifically, the oscillator 203b is disposed at the center, and resilient supporting members 202b are connected to the opposite sides of the oscillator 203b. Furthermore, substrate-connection members 201b are connected to the outside edges of the resilient supporting members, respectively. Like the first embodiment, a magnet 204b to be shared is set and fixed on the oscillator 203b which is placed at the middle. If it is an unmagnetized magnetic material 204b, after the same is set, a magnetic field is applied in parallel to the magnetic material 204b to polarize the same. Subsequently, as shown by x-direction cutting/separating lines 301b and y-direction cutting/separating lines 302b (dash-and-dot lines) in FIG. 3A, the magnets 204b, oscillators 203b and substrate-connection members 201b are cut simultaneously and these are separated.

In the oscillator device manufactured in accordance with the method of the present embodiment as well, a magnetic force is applied to the so cut and separated magnet 204b and oscillator 203, by use of an electromagnet 401b or the like, in a similar manner as has been done in the first embodiment. In response, the oscillator 203b oscillates around an axis defined by the resilient supporting members 202b. In this way, based on the manufacturing method of the present embodiment as well, an oscillatory type actuator which can be produced with high productivity and which has an accurate center of gravity balance of the oscillator, functions very well.

Embodiment 3

Figure 4A:
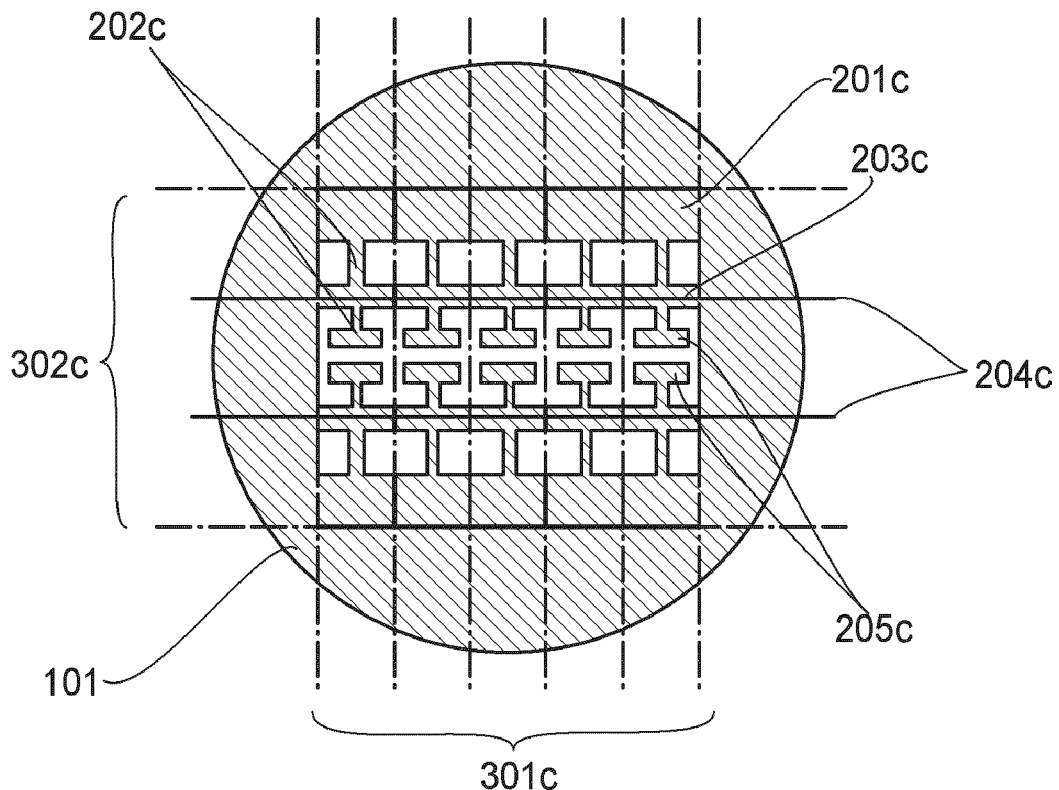
FIGS. 4A and 4B are schematic diagrams for explaining an oscillator device such as an oscillatory type actuator according to a manufacturing method of a third embodiment of the present invention, the diagrams showing the same in an unseparated state and an assembled state, respectively.
Figure 4B:
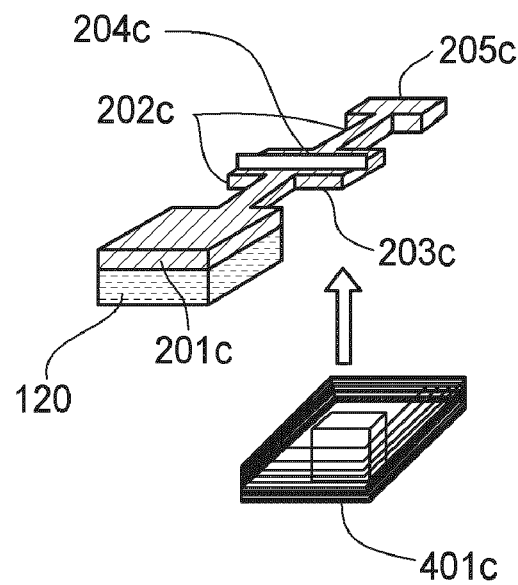
Figure 5:
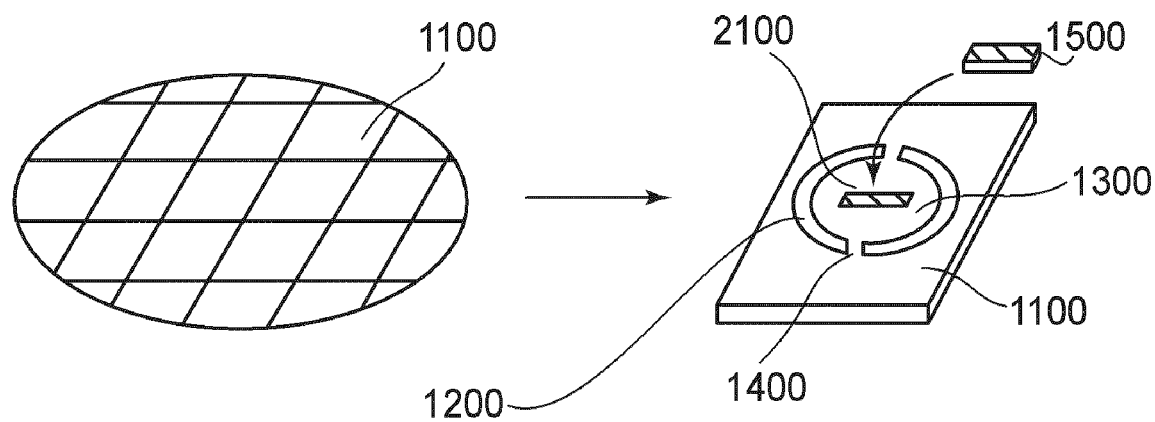
FIG. 5 is a schematic diagram showing an oscillatory type actuator of a conventional example.

FIGS. 4A and 4B are schematic diagrams for explaining a method of manufacturing an oscillatory type actuator according to a third embodiment of the present invention. The manufacturing method of the third embodiment as well includes similar steps as of those of FIGS. 1A-1G.

In this embodiment, an oscillatory type actuator which comprises an oscillator 203c, resilient supporting members 202c, a substrate-connection member 201c and a vibrator 205c which is another oscillator, is produced. In this basic structure, a resilient supporting member 202c and an oscillator 203c are connected to the substrate-connection member 201c, sequentially. Then, another resilient supporting member 202c and a vibrator 205c are connected thereto, sequentially. Thus, the structure has two oscillators.

In this embodiment as well, like the first embodiment, the magnet 204c to be shared is set and fixed on the oscillator 203c. After an unmagnetized magnetic material 204c is set, a magnetic field is applied in parallel to the magnetic material 204c, to polarize the same. Subsequently, as shown by the x-direction cutting/separating lines 301c and the y-direction cutting/separating lines 302c (dash-and-dot line) in FIG. 4A, magnets 204c, oscillators 203c and substrate-connection members 201c are cut simultaneously, and these are separated.

In the oscillator device manufactured in accordance with the method of the present embodiment as well, a magnetic force is applied to the so cut and separated magnet 204c and oscillator 203c, by use of an electromagnet 401c or the like, in a similar manner as has been done in the first embodiment. In response, both the oscillator 203c and the vibrator 205c oscillate around an axis defined by the resilient supporting member 202c. In this way, based on the manufacturing method of the present embodiment as well, an oscillatory type actuator which can be produced with high productivity and which has an accurate center of gravity balance of the oscillator, functions very well.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-223322 filed Aug. 30, 2007, for which is hereby incorporated by reference.

What is claimed is:

1. A method of manufacturing oscillator devices each having an oscillator and a resilient supporting member that supports the oscillator for oscillatory motion, said method comprising:
   a step of processing one and the same substrate to form oscillators and resilient supporting members of oscillator devices so that oscillators of adjacent oscillator devices are connected to each other;
   a step of forming or placing a magnetic material so that it extends across the connected oscillators of the adjacent oscillator devices; and
   a step of simultaneously cutting and separating the connected oscillators and the magnetic material formed or placed to extend across the connected oscillators.

2. A method according to claim 1, wherein the magnetic material formed or placed to extend across the connected oscillators is unmagnetized and wherein, said method further comprises, before the cutting and separating step, a step of applying a magnetic field to a portion or the whole of the substrate to magnetize the magnetic material at once to produce a permanent magnet.

3. A method according to claim 1, wherein the magnetic material formed or placed to extend across the connected oscillators is a permanent magnet having been previously magnetized.

4. A method according to claim 1, wherein the connected oscillators and the magnetic material formed or placed to extend across the connected oscillators are simultaneously cut and separated by performing a dicing operation.

5. A method according to claim 1, wherein the connected oscillators and the magnetic material formed or placed to extend across the connected oscillators are simultaneously cut and separated by a laser.

* * * * *